(12) United States Patent
Fergus et al.

(10) Patent No.: US 11,758,843 B2
(45) Date of Patent: Sep. 19, 2023

(54) MOWER DECK BELT TENSIONING ARM

(71) Applicant: Deere & Company, Moline, IL (US)

(72) Inventors: Ryan A. Fergus, Omro, WI (US); Samuel W. Patterson, Beaver Dam, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/280,259

(22) Filed: Sep. 29, 2016

(65) Prior Publication Data

US 2018/0084715 A1   Mar. 29, 2018

(51) Int. Cl.
*A01D 34/76*   (2006.01)
*A01D 69/12*   (2006.01)
*A01D 69/06*   (2006.01)

(52) U.S. Cl.
CPC .............. *A01D 34/76* (2013.01); *A01D 69/06* (2013.01); *A01D 69/12* (2013.01)

(58) Field of Classification Search
CPC ......... A01D 34/76; A01D 69/06; A01D 69/12
See application file for complete search history.

(56) References Cited

U.S. PATENT DOCUMENTS

| | | |
|---|---|---|
| 3,142,193 A | 7/1964 | Polko et al. |
| 3,356,426 A * | 12/1967 | Fadow ..................... B62D 7/18 384/139 |
| 3,412,537 A | 11/1968 | Enters et al. |
| 3,613,462 A | 10/1971 | Stibbe |
| 4,068,452 A | 1/1978 | Schaefer et al. |
| 4,159,613 A | 7/1979 | Knudson et al. |
| 4,213,288 A | 7/1980 | Takeuchi et al. |
| 4,231,215 A | 11/1980 | Klas |
| 4,265,133 A | 5/1981 | Van Der Meulen et al. |
| 4,300,332 A * | 11/1981 | Jackson ............. A01D 34/6806 56/11.3 |
| 4,325,210 A | 4/1982 | Marto |
| 4,464,146 A * | 8/1984 | Arthur ................... F16H 7/1209 474/133 |
| 4,498,889 A | 2/1985 | Stevens et al. |
| 4,511,348 A | 4/1985 | Witdoek et al. |
| 4,522,514 A | 6/1985 | Olschewski et al. |
| 4,813,215 A | 3/1989 | Chase et al. |
| 4,939,892 A * | 7/1990 | Kawasaki .............. A01D 34/69 56/11.1 |
| 4,973,290 A * | 11/1990 | Hans ...................... F16H 7/0834 474/138 |
| 5,012,632 A | 5/1991 | Kuhn et al. |
| 5,246,403 A | 9/1993 | Uphaus |
| 5,361,566 A | 11/1994 | Hohnl |
| 5,542,243 A * | 8/1996 | Yuki ..................... A01D 43/077 56/13.3 |
| 5,769,747 A | 6/1998 | Kuhn et al. |

(Continued)

Primary Examiner — Alicia Torres

(57) ABSTRACT

A mower deck belt tensioning arm having a sheet metal body with an idler pulley rotatably mounted to a first end of the body. A spring is connected to a second end of the body biasing the idler pulley against a belt on a mower deck rotating a plurality of blade pulleys. An integrally formed in bushing is between the first end and the second end of the body, the bushing having a straight section length greater than the thickness of the sheet metal body and pivotably mounted around a spindle secured to the mower deck.

2 Claims, 4 Drawing Sheets

(56) References Cited

U.S. PATENT DOCUMENTS

| | | | |
|---|---|---|---|
| 6,120,401 A | 9/2000 | Wilken | |
| 6,176,071 B1 | 1/2001 | Thorman et al. | |
| 6,282,873 B1 | 9/2001 | Wilken | |
| 6,312,352 B1 | 11/2001 | Holland et al. | |
| 6,334,292 B1 | 1/2002 | Welch et al. | |
| 6,398,681 B1 | 6/2002 | Wanie | |
| 6,575,858 B2 | 6/2003 | Green et al. | |
| 6,602,155 B2 | 8/2003 | Buss et al. | |
| 6,796,419 B2 | 9/2004 | Sousek et al. | |
| 6,952,913 B1 | 10/2005 | Crumly | |
| 7,028,456 B2 * | 4/2006 | Thatcher | A01D 34/74 56/15.6 |
| 7,461,977 B2 | 12/2008 | Davis et al. | |
| 7,913,479 B2 | 3/2011 | Eavenson, Sr. | |
| 8,092,328 B2 | 1/2012 | Dec et al. | |
| 8,587,166 B2 | 10/2013 | Minoura et al. | |
| 11,365,788 B2 * | 6/2022 | Quintanilla Salas | F16H 7/02 |

\* cited by examiner

MOWER DECK BELT TENSIONING ARM

FIELD OF THE INVENTION

This invention relates to a mower deck belt tensioning arm on a grass mowing vehicle.

BACKGROUND OF THE INVENTION

Many conventional grass mowing vehicles utilize a belt and pulley system for transmitting driving power from the vehicle power source to the blade spindles. These systems include a plurality of blade pulleys fixed with respective blade spindles. A drive belt engages these blade pulleys. A drive pulley which drivingly engages the belt typically receives rotational power from the vehicle's power source via a gear box, hydraulic motor, or belt and pulley system. An idler pulley may be used to engage and disengage a relatively slack or loose portion of the belt, and may be biased against the belt for placing drive tension in the belt. The belt tension provided by the idler pulley establishes the proper friction between the belt and blade pulleys to prevent slippage. The belt tension applied by the idler pulley also generally prevents slack from accumulating in the belt, and generally prevents the belt from becoming disengaged from the pulleys during operation.

An idler pulley may be carried on a tensioning arm that pivots for pressing the idler pulley against the belt. A spring connected to the tensioning arm may pull the tensioning arm and idler pulley toward the belt. The tensioning arm may be mounted to a shaft on the mower deck, which is subject to side or bending loads from the tensioning arm as the pulley is pressed against the belt. To handle and withstand these loads, the tensioning arm may include a bushing that is welded into a stamped or laser cut arm. Or the tensioning arm may include a bushing that is integral to an arm produced using a powder metal process, as shown in U.S. Pat. No. 6,602,155. Alternatively, the tensioning arm may be assembled to a sleeve having bearing assemblies designed to reduce wear, such as shown in U.S. Pat. No. 7,461,977.

A low cost mower deck belt tensioning arm is needed that does not require welding or assembly of a bushing into the arm, and that may be produced using a lower cost process than powder metal or die casting.

SUMMARY OF THE INVENTION

A mower deck belt tensioning arm with a one piece sheet metal body having an integrally formed in bushing that fits over a spindle on a mower deck and pivots the body relative to the spindle in response to a biasing spring. A lubrication cavity may be provided between the spindle and the bushing. An idler pulley on a first end of the sheet metal body engages a belt that rotates a plurality of pulleys as the body pivots relative to the spindle.

DESCRIPTION OF THE PREFERRED EMBODIMENT

Figure 1:
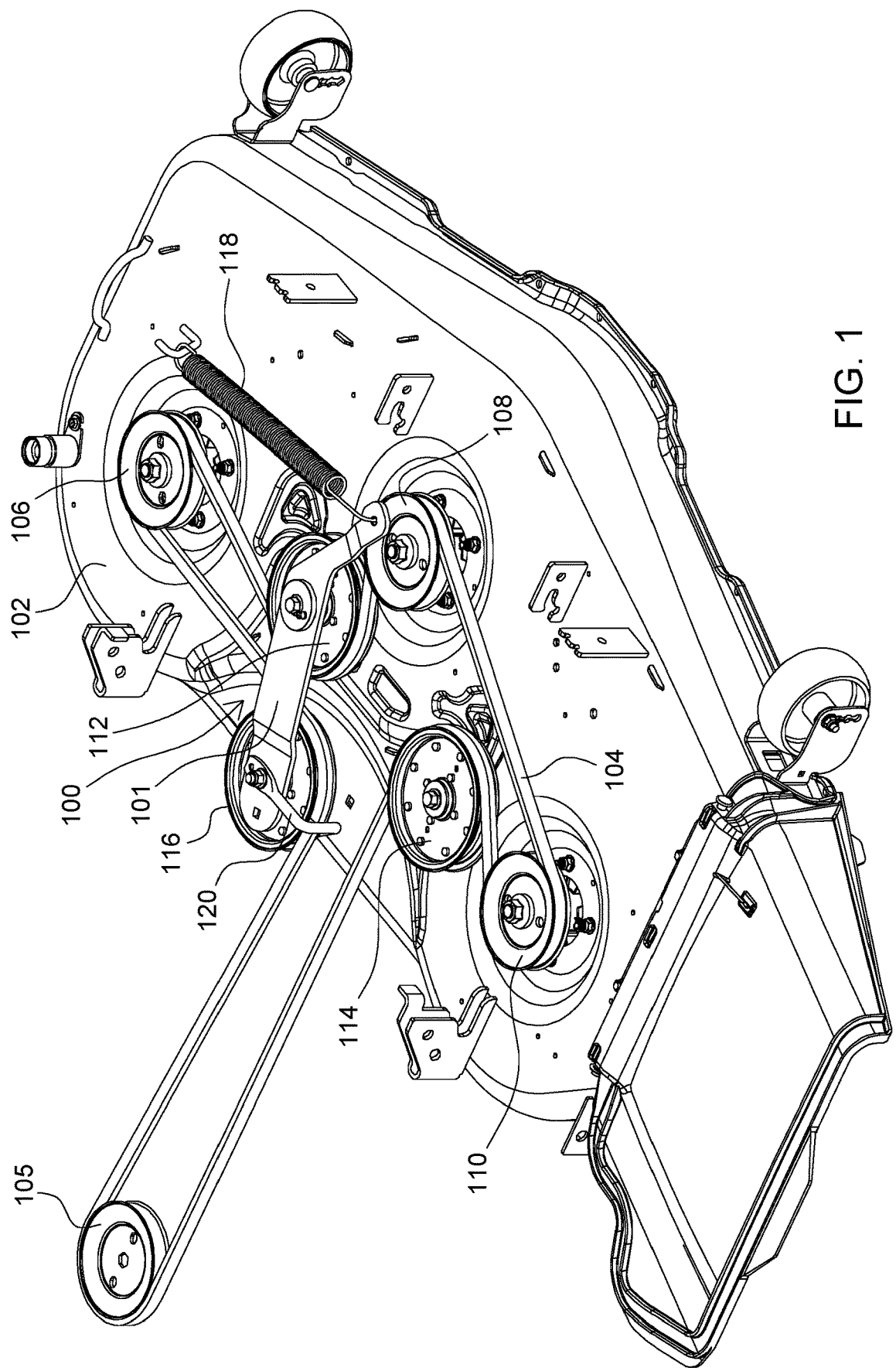
FIG. 1 is a top perspective view of a mower deck with a belt tensioning arm according to a first embodiment of the invention.
Figure 2:
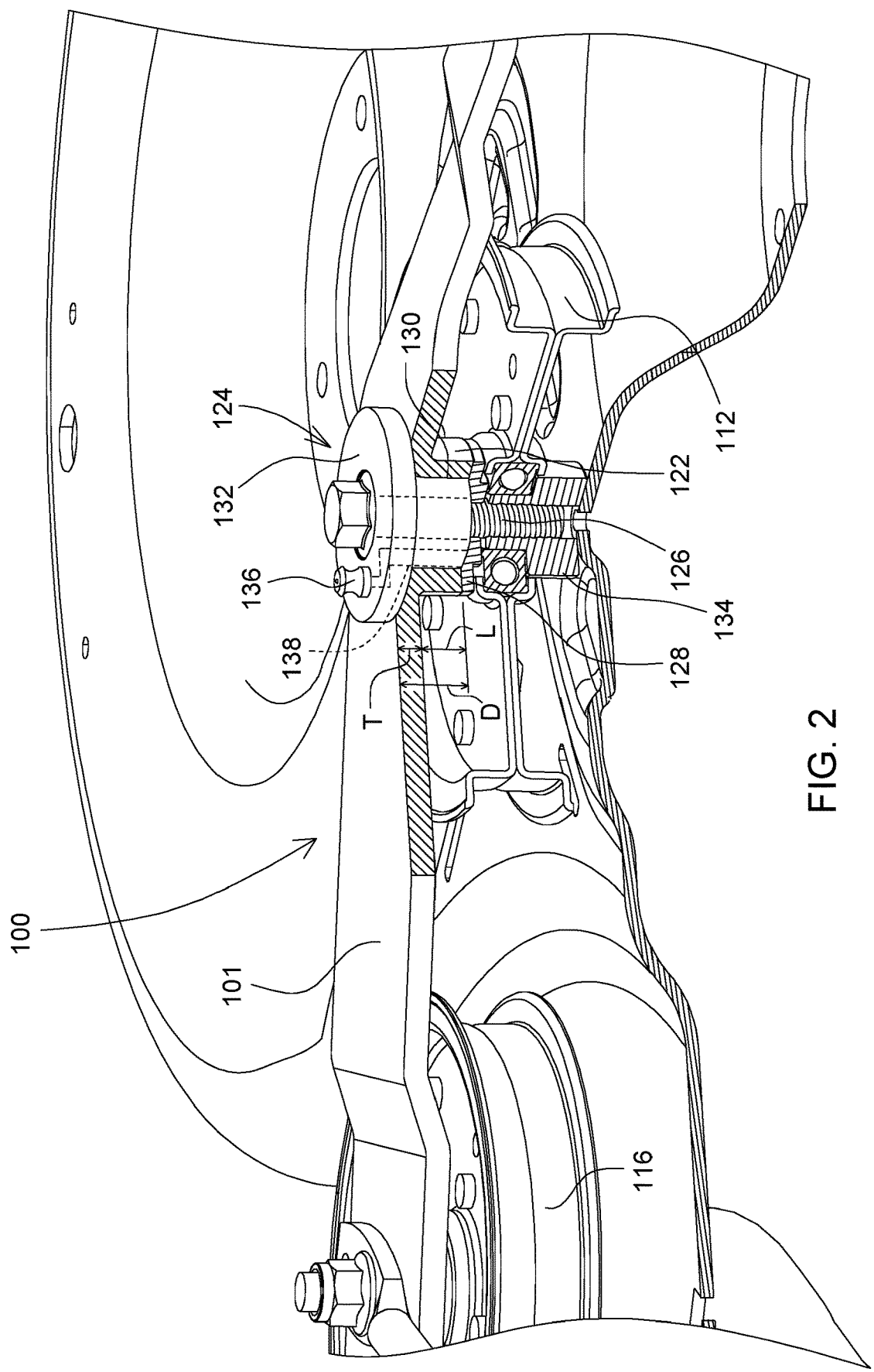
FIG. 2 is a side perspective view, partially in section, of a mower deck belt tensioning arm according to a first embodiment of the invention.

In a first embodiment shown in FIGS. 1-2, mower deck belt tensioning arm 100 may be pivotably mounted on the top surface of mower deck 102. The mower deck may cover a plurality of rotary mower blades mounted to spindles. To rotate the grass cutting blades, endless belt 104 may engage drive pulley 105, blade pulleys 106, 108, 110 and guide pulleys 112, 114. To provide belt tension, idler pulley 116 may be rotatably mounted to tensioning arm 100, and coil spring 118 connected to the tensioning arm may urge the idler pulley against the belt. Belt guide 120 also may be mounted to the tensioning arm to help prevent disengagement of the belt from the idler pulley.

In the first embodiment, mower deck belt tensioning arm 100 may have a one piece sheet metal body 101 and an integrally formed in bushing 122. The bushing may be formed in the same sheet metal blank as the body using a deep drawing process. The depth of the extrusion (D) for the bushing may be at least about twice the thickness of the body (T), and the straight section length (L) of the bushing may be greater than the body thickness (T).

In one embodiment, mower deck belt tensioning arm 100 may be mounted to the mower deck with a mounting assembly that allows the tensioning arm to pivot. The tensioning arm may be mounted to the mower deck on the same axis as guide pulley 112 to minimize parts and cost. Alternatively, the tensioning arm may be mounted to the mower deck at another location. The mounting assembly parts may include spindle 124, bolt 126 and spacer 128. Spindle upright 130 may be inserted through bushing 122. Spindle head 132 may extend radially outwardly from the upright. Bolt 126 may be inserted through the spindle's internal bore, washer 128 and guide pulley 112, and threaded to post 134 where guide pulley 112 is rotatably mounted to the mower deck. Spindle head 132 may extend over the tensioning arm with sufficient clearance for the tensioning arm to pivot. Spacer 128 may provide a supporting surface for bushing 122.

In the first embodiment, the mounting assembly for the mower deck belt tensioning arm may provide lubrication between bushing 122 and spindle 124. For example, grease zerk 136 in spindle head 132 may provide lubrication into cavity 138 between the bushing and spindle upright.

Figure 3:
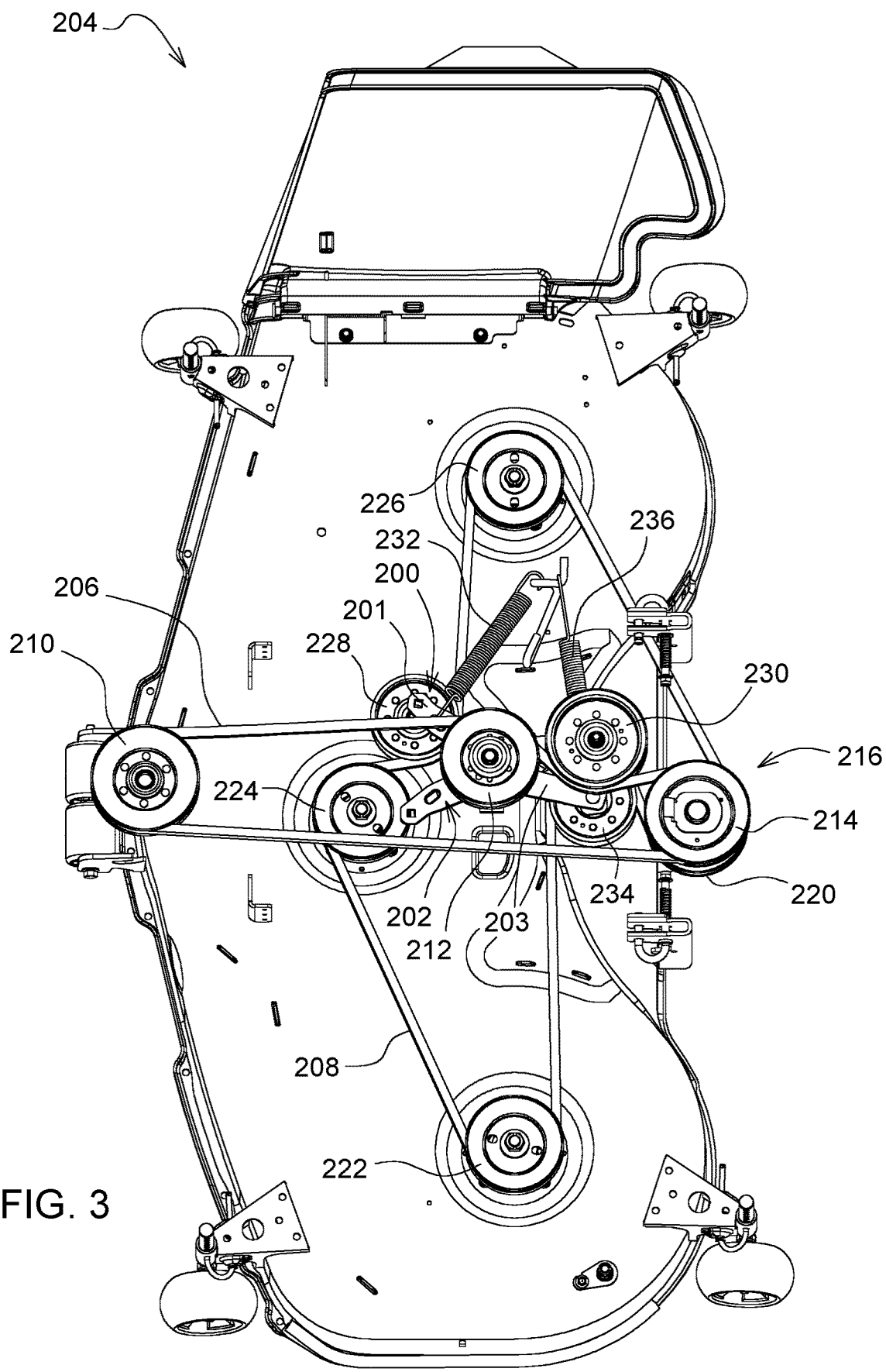
FIG. 3 is a top perspective view of a mower deck with a pair of belt tensioning arms according to a second embodiment of the invention.
Figure 4:
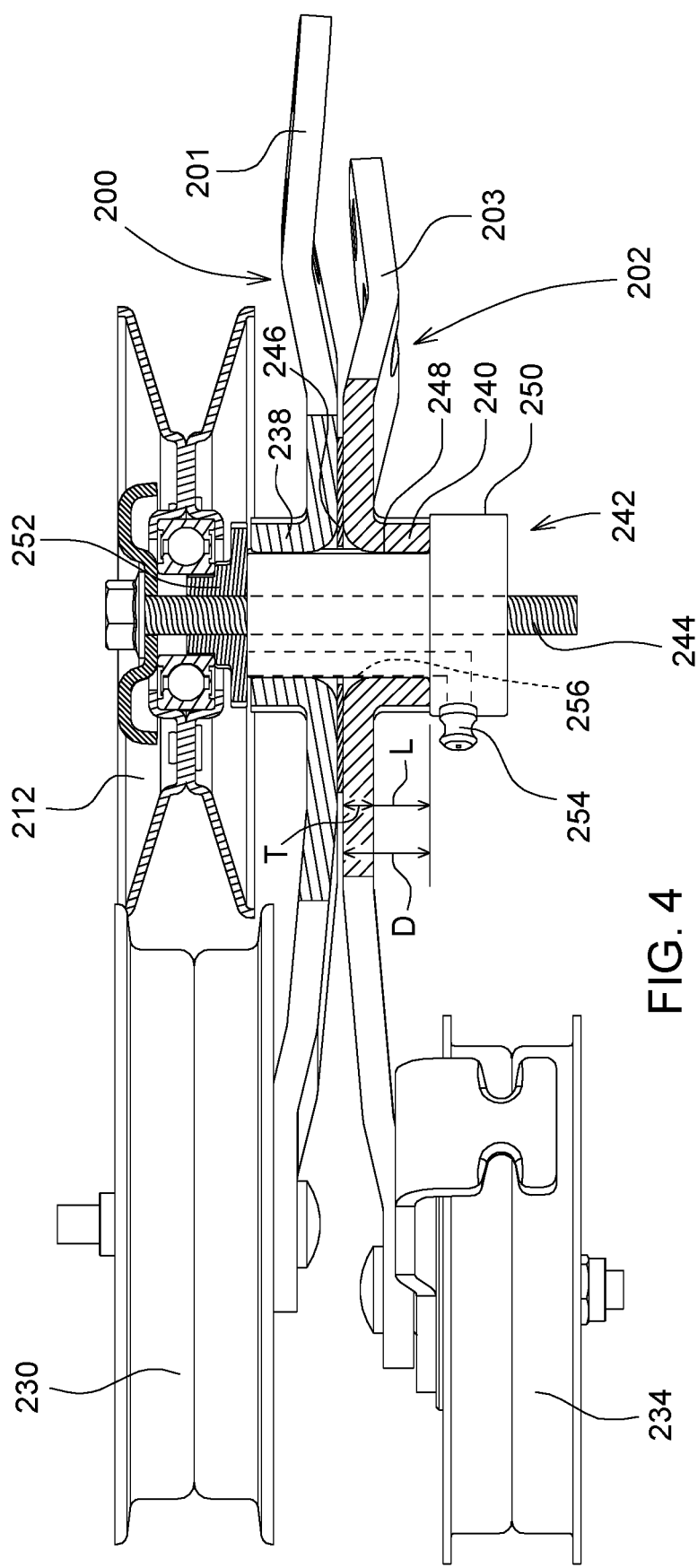
FIG. 4 is a side view, partially in section, of a pair of mower deck belt tensioning arms according to a second embodiment of the invention.

In a second embodiment shown in FIGS. 3-4, first and second mower deck belt tensioning arms 200, 202 may be pivotably mounted on top of mower deck 204. The mower deck may cover a plurality of rotary mower blades mounted to spindles. The mower deck may have a pair of endless belts 206, 208 to rotate the grass cutting blades. First endless belt 206 may engage drive pulley 210, guide pulley 212 and first pulley 214 on jack sheave 216. Second endless belt 208 may engage second pulley 220 on jack sheave 216, blade pulleys 222, 224, 226, and guide pulley 228. To tension the first belt, idler pulley 230 may be rotatably mounted to tensioning arm 200, and coil spring 232 may be connected to tensioning arm 200 to urge the idler pulley against the first belt. To tension the second belt, idler pulley 234 may be rotatably mounted to tensioning arm 202, and coil spring 236 may be connected to tensioning arm 202 to urge the idler pulley against the belt.

In the second embodiment, mower deck belt tensioning arms 200, 202 may be identical one piece sheet metal parts, each arm having a one piece sheet metal body 201, 203 and an integrally formed in bushing 238, 240. The bushing may be formed in the same sheet metal blank as the arm using a deep drawing process. The depth of the extrusion (D) for each bushing may be at least about twice the thickness of the blank (T), and the straight section length (L) of each bushing may be greater than the blank thickness (T).

In the second embodiment, the pair of mower deck belt tensioning arms 200, 202 may be mounted to the mower deck with a mounting assembly that allows each tensioning arm to pivot independently. The tensioning arms may be mounted back to back on the same spindle 242, and the same axis as guide pulley 212 to minimize parts and cost. Alternatively, each tensioning arm may be mounted to the mower deck at other locations. The mounting assembly parts may include spindle 242, bolt 244 and washer 246. Spindle upright 248 may be inserted through both bushings 238, 240. Spindle head 250 may extend radially outwardly from the upright, and provide a supporting surface for the lower bushing. Bolt 244 may be inserted through guide pulley 212, spacer 252 and the spindle's internal bore, and threaded to a bracket or post on the mower deck. Spacer 246 may provide low friction surfaces between the first and second tensioning arms.

In the second embodiment, the mounting assembly for the mower deck belt tensioning arms may provide lubrication between bushings 238, 240, washer 246 and spindle 242. For example, grease zerk 254 in spindle head 250 may provide lubrication into cavity 256 between the bushing and spindle upright.

Having described the preferred embodiment, it will become apparent that various modifications can be made without departing from the scope of the invention as defined in the accompanying claims.

The invention claimed is:

1. A pair of mower deck belt tensioning arms, each tensioning arm having a one piece sheet metal body including an integral bushing extending perpendicularly from an interior portion of the body and pivotably mounted above a guide pulley on a spindle secured to a mower deck, each tensioning arm biasing an idler pulley on an end of the body into engagement with one of a pair of belts on the mower deck, each belt engaging a different plurality of pulleys; a spindle upright extending through the integral bushing of each tensioning arm and having a head extending radially outwardly and providing clearance for the pair of tensioning arms to pivot.

2. The pair of mower deck belt tensioning arms of claim 1, further comprising a lubrication cavity between the spindle upright and the integral bushing of each tensioning arm.

* * * * *